US012697977B2

(12) United States Patent
Aizawa et al.

(10) Patent No.: US 12,697,977 B2
(45) Date of Patent: \*Aug. 4, 2026

(54) DEVICE FOR CONTROLLING MOBILE OBJECT AND METHOD FOR CONTROLLING MOBILE OBJECT

(71) Applicant: HONDA MOTOR CO., LTD., Tokyo (JP)

(72) Inventors: Koki Aizawa, Wako (JP); Yunosuke Kuramitsu, Wako (JP); Kento Shirakata, Wako (JP); Ryoji Wakayama, Wako (JP); Hideki Matsunaga, Wako (JP); Takashi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 18/851,102

(22) PCT Filed: Mar. 30, 2022

(86) PCT No.: PCT/JP2022/015796
§ 371 (c)(1),
(2) Date: Sep. 26, 2024

(87) PCT Pub. No.: WO2023/188060
PCT Pub. Date: Oct. 5, 2023

(65) Prior Publication Data
US 2025/0187604 A1 Jun. 12, 2025

(51) Int. Cl.
*B60W 30/18* (2012.01)
*B60W 30/14* (2006.01)
(Continued)

(52) U.S. Cl.
CPC ........ *B60W 30/182* (2013.01); *B60W 30/146* (2013.01); *B60W 50/14* (2013.01);
(Continued)

(58) Field of Classification Search
CPC .. B60W 30/182; B60W 30/146; B60W 50/14; B60W 2552/05; B60W 2420/403; B60W 2540/10; G06V 20/588
See application file for complete search history.

(56) References Cited

U.S. PATENT DOCUMENTS 6,491,122 B2 * 12/2002 Leitner .................. B62K 5/025
180/908
10,915,762 B1 * 2/2021 Russell ................ G06V 40/103
(Continued)

FOREIGN PATENT DOCUMENTS

CN 110920613 B * 1/2025 ...... B60W 30/18072
DE 102018206044 10/2019
(Continued)

OTHER PUBLICATIONS

JP-2017100490-A machine translation (Year: 2017).*
(Continued)

*Primary Examiner* — Angelina M Shudy
(74) *Attorney, Agent, or Firm* — Amin, Turocy & Watson, LLP

(57) ABSTRACT

A device for controlling a mobile object capable of moving both on a roadway and in a predetermined area different from the roadway, one or more passengers boarding the mobile object, includes a road type recognizer that recognizes whether the mobile object is moving on the roadway or moving in the predetermined area on the basis of an output of an external detection device that detects an external situation of the mobile object, and a controller that causes the mobile object to travel in any one of a first
(Continued)

traveling state in which a speed of the mobile object is limited to a first speed and a second traveling state in which the speed of the mobile object is limited to a second speed lower than the first speed, on the basis of a road type recognized by the road type recognizer, and the controller causes the mobile object to travel in the second traveling state when the mobile object is traveling in the predetermined area, and performs switching between the first traveling state and the second traveling state in response to an instruction regarding the traveling state of the mobile object received from the passenger when the mobile object is caused to travel from the predetermined area to the roadway.

9 Claims, 6 Drawing Sheets

(51) Int. Cl.
    *B60W 30/182* (2020.01)
    *B60W 50/14* (2020.01)
    *G06V 20/56* (2022.01)
(52) U.S. Cl.
    CPC ..... *G06V 20/588* (2022.01); *B60W 2420/403* (2013.01); *B60W 2540/10* (2013.01); *B60W 2552/05* (2020.02)

(56) References Cited

U.S. PATENT DOCUMENTS

| | | | | | |
|---|---|---|---|---|---|
| 11,485,345 | B2 * | 11/2022 | Kuroda | ................. | B60W 10/08 |
| 12,208,806 | B2 * | 1/2025 | Zhou | ................... | B60W 60/001 |
| 12,240,479 | B2 * | 3/2025 | Matsunaga | .......... | G08G 1/0133 |
| 12,403,903 | B2 * | 9/2025 | Matsunaga | .......... | G06V 20/588 |
| 2007/0208483 | A1 * | 9/2007 | Rabin | .................. | G05D 1/0891 |
| | | | | | 701/72 |
| 2009/0228175 | A1 * | 9/2009 | Borgesson | ............. | B60K 35/10 |
| | | | | | 701/48 |
| 2010/0114468 | A1 * | 5/2010 | Field | ........................ | B60N 2/06 |
| | | | | | 701/124 |
| 2012/0203424 | A1 * | 8/2012 | Filev | .................... | B60W 50/00 |
| | | | | | 701/36 |
| 2013/0226431 | A1 * | 8/2013 | Lu | ..................... | B60W 50/0098 |
| | | | | | 701/96 |
| 2015/0025769 | A1 | 1/2015 | Franganillo et al. | | |
| 2015/0332114 | A1 * | 11/2015 | Springer | .............. | B60W 50/14 |
| | | | | | 348/148 |
| 2016/0214675 | A1 * | 7/2016 | DeCordova | ............. | B62M 6/65 |
| 2018/0012196 | A1 | 1/2018 | Ricci et al. | | |
| 2018/0022349 | A1 * | 1/2018 | Fairgrieve | ........... | B22D 21/005 |
| | | | | | 701/93 |
| 2018/0046196 | A1 * | 2/2018 | Hashimoto | .......... | B60W 50/14 |
| 2019/0101916 | A1 * | 4/2019 | Sen | .................. | B60W 60/0055 |
| 2019/0144000 | A1 * | 5/2019 | Hennes | .................. | G06F 16/29 |
| | | | | | 701/23 |
| 2019/0220008 | A1 * | 7/2019 | Mizuno | ............. | B60W 60/0051 |
| 2019/0248439 | A1 * | 8/2019 | Wang | ..................... | B62K 11/10 |
| 2019/0375427 | A1 * | 12/2019 | Whitt | .................... | B60W 10/08 |
| 2019/0383627 | A1 * | 12/2019 | Nangeroni | ........ | B60W 50/0098 |
| 2020/0086846 | A1 * | 3/2020 | Kuroda | ............... | B60W 40/105 |
| 2020/0124430 | A1 * | 4/2020 | Bradlow | ................ | B62J 45/412 |
| 2020/0341470 | A1 * | 10/2020 | Maeda | .............. | G01C 21/3822 |
| 2020/0398923 | A1 * | 12/2020 | Griffith | .................... | B62J 45/00 |
| 2020/0410256 | A1 * | 12/2020 | Bayer | ........................ | G06T 7/13 |
| 2021/0001889 | A1 * | 1/2021 | Furukawa | ........... | G06V 20/586 |
| 2021/0034156 | A1 * | 2/2021 | Drayna | ................. | B62K 5/007 |
| 2021/0110716 | A1 * | 4/2021 | Becker | ............... | B60W 30/085 |
| 2021/0165404 | A1 * | 6/2021 | Gillett | ............... | G01C 21/3691 |
| 2021/0191424 | A1 * | 6/2021 | Drayna | ............... | G08G 1/0129 |
| 2021/0197712 | A1 * | 7/2021 | Korjus | ................... | G05D 1/224 |
| 2021/0310820 | A1 * | 10/2021 | Park | ................... | G01C 21/3415 |
| 2022/0044551 | A1 | 2/2022 | Sheckler et al. | | |
| 2023/0245223 | A1 * | 8/2023 | Okai | ................. | G06Q 30/0261 |
| | | | | | 705/307 |
| 2023/0249716 | A1 * | 8/2023 | Oguro | ................... | B60W 40/06 |
| 2023/0375347 | A1 * | 11/2023 | Nimura | ................. | B60W 40/06 |
| 2024/0326869 | A1 * | 10/2024 | Carroll | ............... | B60W 30/085 |
| 2024/0404404 | A1 * | 12/2024 | Rouhi | ................... | G08G 1/012 |
| 2025/0206315 | A1 * | 6/2025 | Matsunaga | ......... | B60W 30/182 |
| 2025/0390114 | A1 * | 12/2025 | Kim | ....................... | G05D 1/693 |

FOREIGN PATENT DOCUMENTS

| | | | |
|---|---|---|---|
| EP | 0403977 | | 12/1990 |
| EP | 2969634 | | 3/2020 |
| JP | 03-155859 | | 7/1991 |
| JP | 2011-016615 | | 1/2011 |
| JP | 2014-039772 | | 3/2014 |
| JP | 2015-186321 | | 10/2015 |
| JP | 2017-100490 | | 6/2017 |
| JP | 2017100490 | A * | 6/2017 |
| JP | 2019-197328 | | 11/2019 |
| JP | 2020-189537 | | 11/2020 |
| WO | 2021/230236 | | 11/2021 |

OTHER PUBLICATIONS

CN-110920613-B machine translation (Year: 2025).*

International Search Report and Written Opinion for International Application No. PCT/JP2022/015796 mailed on Jun. 21, 2022, 9 pages.

European Search Report fro European Patent Application No. 22935207.5 mailed Apr. 7, 2025.

International Search Report and Written Opinion for International Application No. PCT/JP2022/015417 mailed on May 31, 2022, 8 pages.

European Search Report for European Patent Application No. 22935126.7 mailed Apr. 2, 2025.

Non-Final Office Action for U.S. Appl. No. 18/850,222 mailed Jan. 16, 2026.

* cited by examiner

DEVICE FOR CONTROLLING MOBILE OBJECT AND METHOD FOR CONTROLLING MOBILE OBJECT

TECHNICAL FIELD

The present invention relates to a device for controlling a mobile object, a method for controlling a mobile object, and a storage medium.

BACKGROUND ART

In the related art, practical application of a mobile object capable of moving on both a sidewalk and a roadway is progressing. In connection therewith, a technology for detecting a direction in which an electric vehicle can move from an image of a block for guiding visually impaired people, which is included in image data captured by an imager, and controlling traveling of the electric vehicle on the basis of the detected direction is known (for example, see Patent Document 1).

CITATION LIST

Patent Document

[Patent Document 1]
Japanese Unexamined Patent Application, First Publication No. 2019-197328

SUMMARY OF INVENTION

Technical Problem

Incidentally, in a mobile object capable of moving on both a sidewalk and a roadway, it is necessary to set different upper limit speeds for the sidewalk and the roadway, but since the roadway is cut off, a speed is switched frequently when the mobile object only travels by a short distance and then travels on the next sidewalk immediately, which is likely to put a burden on a vehicle or passengers. However, in the related art, travel control in an above-described situation is not considered, and there are cases where appropriate travel control cannot be performed depending on a road situation.

The present invention has been made in consideration of the above circumstances, and an object of the present invention is to provide a device for controlling a mobile object, a method for controlling the mobile object, and a storage medium capable of causing a mobile object to travel in a more appropriate traveling state depending on a surrounding road situation.

Solution to Problem

A device for controlling a mobile object, a method for controlling a mobile object, and a storage medium according to the present invention employ the following configurations.

(1): A device for controlling a mobile object according to one aspect of the present invention is a device for controlling a mobile object capable of moving both on a roadway and in a predetermined area different from the roadway, one or more passengers boarding the mobile object, the device for controlling a mobile object including: a road type recognizer configured to recognize whether the mobile object is moving on the roadway or moving in the predetermined area on the basis of an output of an external detection device configured to detect an external situation of the mobile object; and a controller configured to cause the mobile object to travel in any one of a first traveling state in which a speed of the mobile object is limited to a first speed and a second traveling state in which the speed of the mobile object is limited to a second speed lower than the first speed, on the basis of a road type recognized by the road type recognizer, wherein the controller causes the mobile object to travel in the second traveling state when the mobile object is traveling in the predetermined area, and performs switching between the first traveling state and the second traveling state in response to an instruction regarding the traveling state of the mobile object received from the passenger when the mobile object is caused to travel from the predetermined area to the roadway.

(2): In the aspect (1), the device for controlling a mobile object further includes: an operator configured to receive a driving operation for the mobile object by the passenger, wherein the controller determines whether to perform switching from the second traveling state to the first traveling state on the basis of a steering operation of the mobile object by the operator.

(3): In the aspect (2), the controller does not perform switching from the second traveling state to the first traveling state even when the mobile object travels on the roadway from the predetermined area when an amount of steering by the operator is smaller than a predetermined amount.

(4): In the aspect (3), when the mobile object moves from the predetermined area to the roadway and the amount of steering by the operator is smaller than the predetermined amount, the controller does not perform the switching from the second traveling state to the first traveling state even when an operation to accelerate the mobile object is received by the operator.

(5): In the aspect (2), the controller continues the second traveling state when the amount of steering by the operator is smaller than the predetermined amount and a distance from the predetermined area in which the mobile object is traveling to another predetermined area is smaller than a predetermined distance.

(6): In the aspect (2), the controller performs switching from the second traveling state to the first traveling state when control for moving the mobile object toward the roadway through a steering operation in the operator is performed.

(7): In the aspect (1), the controller performs switching from the second traveling state to the first traveling state when the predetermined area is present in a road width direction with a position of the mobile object leaving the predetermined area and traveling on the roadway as a reference.

(8): In the aspect (1), the device for controlling a mobile object further includes: a switching receiver configured to configured receive an instruction regarding switching a traveling state of the mobile object, wherein the controller determines whether to perform switching from the second traveling state to the first traveling state on the basis of the instruction received by the switching receiver.

(9): In the aspect (1), the controller notifies an external notification device of the mobile object that the mobile object is traveling on the roadway in the second traveling state when the mobile object is traveling on the roadway in the second traveling state.

(10): In the aspect (1), the controller notifies the passenger of information for switching from the second traveling state to the first traveling state when the mobile object is traveling on the roadway in the second traveling state.

(11): A method for controlling a mobile object according to another aspect of the present invention is a method for controlling a mobile object including: recognizing whether the mobile object is moving on a roadway or moving in a predetermined area on the basis of an output of an external detection device configured to detect an external situation of the mobile object, by a computer for controlling the mobile object capable of moving both on the roadway and in the predetermined area different from the roadway, one or more passengers boarding the mobile object: causing, by the computer, the mobile object to travel in any one of a first traveling state in which a speed of the mobile object is limited to a first speed and a second traveling state in which the speed of the mobile object is limited to a second speed lower than the first speed, on the basis of a recognized road type: and causing, by the computer, the mobile object to travel in the second traveling state when the mobile object is traveling in the predetermined area, and performing switching between the first traveling state and the second traveling state in response to an instruction regarding the traveling state of the mobile object received from the passenger when the mobile object is caused to travel from the predetermined area to the roadway.

(12): A storage medium according to another aspect of the present invention is a storage medium having a program stored therein, the program causing a computer for controlling a mobile object capable of moving both on a roadway and in a predetermined area different from the roadway, one or more passengers boarding the mobile object, to recognize whether the mobile object is moving on the roadway or moving in the predetermined area on the basis of an output of an external detection device configured to detect an external situation of the mobile object, cause the mobile object to travel in any one of a first traveling state in which a speed of the mobile object is limited to a first speed and a second traveling state in which the speed of the mobile object is limited to a second speed lower than the first speed, on the basis of a recognized road type, and cause the mobile object to travel in the second traveling state when the mobile object is traveling in the predetermined area, and perform switching between the first traveling state and the second traveling state in response to an instruction regarding the traveling state of the mobile object received from the passenger when the mobile object is caused to travel from the predetermined area to the roadway.

Advantageous Effects of Invention

According to the aspects (1) to (12), it is possible to cause the mobile object to travel in a more appropriate traveling state depending on a surrounding road situation.

DESCRIPTION OF EMBODIMENTS

Hereinafter, embodiments of a device for controlling a mobile object, a method for controlling a mobile object, and a storage medium of the present invention will be described with reference to the drawings. The mobile object moves both on a roadway and in a predetermined area different from the roadway. The mobile object is sometimes referred to as micromobility. An electric scooter is a type of micromobility. The predetermined area is, for example, a sidewalk. Further, the predetermined area may be some or all of a roadside strip, a bicycle lane, public open space, or the like, or may include all of a sidewalk, a roadside strip, a bicycle lane, a public open space, or the like. In the following description, it is assumed that the predetermined area is a sidewalk. In the following description, a portion described as "sidewalk" can be appropriately read as a "predetermined area".

Figure 1:
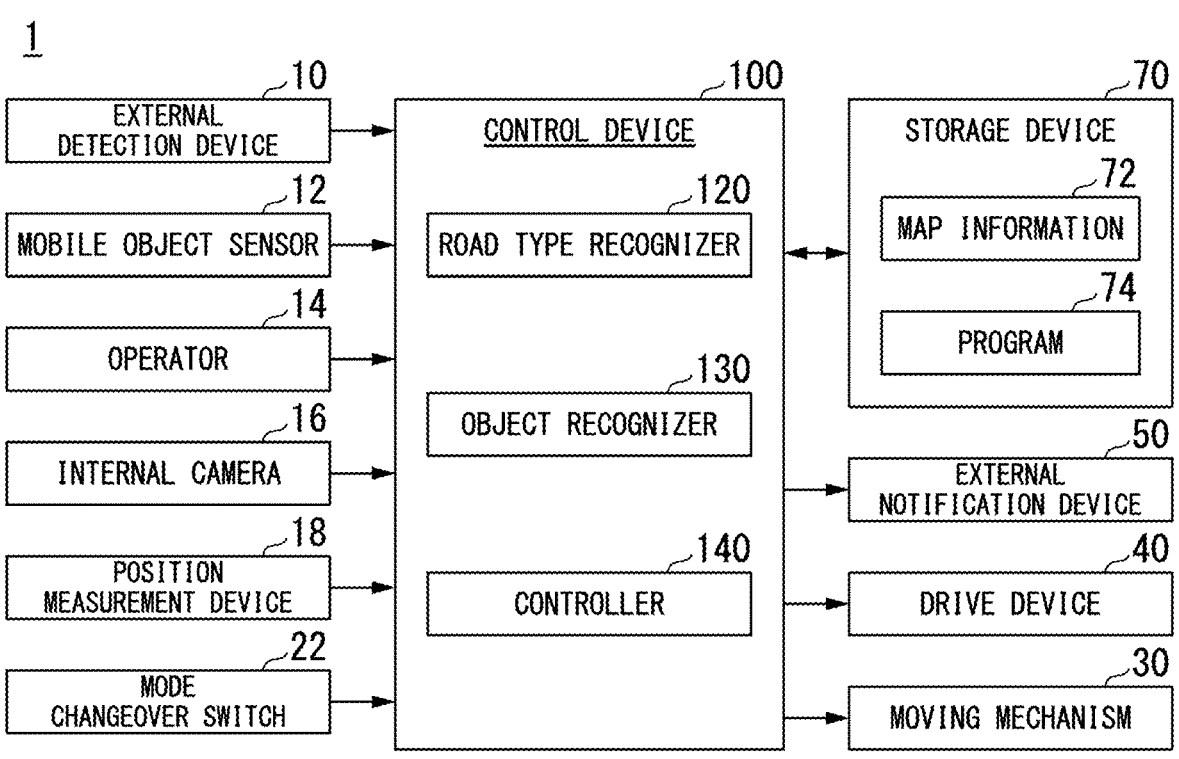
FIG. 1 is a diagram showing an example of a configuration of a mobile object 1 and a control device 100 according to an embodiment.

FIG. 1 is a diagram showing an example of a configuration of a mobile object 1 and a control device 100 according to an embodiment. For example, an external detection device 10, a mobile object sensor 12, an operator 14, an internal camera 16, a position measurement device 18, a mode changeover switch 22, a moving mechanism 30, a drive device 40, an external notification device 50, a storage device 70, and a control device 100 are mounted on the mobile object 1. Some of these configurations that are not essential for realization of a function of the present invention may be omitted. The mode changeover switch 22 is an example of a "switching receiver".

The external detection device 10 is a variety of devices whose detection range is in a traveling direction of the mobile object 1. The external detection device 10 includes an external camera, a radar device, a light detection and ranging (LIDAR), a sensor fusion device, and the like. The external detection device 10 detects an external situation of the mobile object 1. Further, the external detection device 10 outputs information indicating a detection result (image, position of an object, or the like) to the control device 100.

The mobile object sensor 12 includes, for example, a speed sensor, an acceleration sensor, a yaw rate (angular velocity) sensor, an azimuth sensor, and an operation amount detection sensor attached to the operator 14.

The operator 14 receives a driving operation by a passenger of the mobile object. Examples of the operator 14 include an operator for instructing acceleration or deceleration (for example, an accelerator pedal, a brake pedal, or a dial switch or a lever for speed adjustment), and an operator for instructing steering (for example, a steering wheel). In this case, the mobile object sensor 12 may include an accelerator opening sensor, a brake depression amount sensor, a steering torque sensor, and the like. The mobile object 1 may include, as the operator 14, an operator in an aspect other than the above (for example, a non-circular rotary operator, a joystick, or a button).

The internal camera 16 images at least a head of the passenger in the mobile object 1 from the front. The internal camera 16 is a digital camera using an imaging device such as a charge coupled device (CCD) or a complementary metal oxide semiconductor (CMOS). The internal camera 16 outputs the captured image to the control device 100.

The position measurement device 18 is a device that measures a position of the mobile object 1. The position measurement device 18 is, for example, a global navigation satellite system (GNSS) receiver, and specifies the position of the mobile object 1 on the basis of a signal received from a GNSS satellite, and outputs the position of the mobile object 1 as position information. The position information of the mobile object 1 may be estimated from a position of a Wi-Fi base station to which a communication device mounted on the mobile object 1 is connected.

The mode changeover switch 22 is a switch that is operated by a passenger. The mode changeover switch 22 receives an instruction regarding switching of the traveling state of the mobile object 1. The mode changeover switch 22 may be a mechanical switch or may be a graphical user interface (GUI) switch set on a touch panel. The mode changeover switch 22 receives, for example, an operation for switching a driving mode to any one of mode A: an assist mode in which one of a steering operation and an acceleration or deceleration control is performed by the passenger, and the other is performed automatically, which includes mode A-1 in which the steering operation is performed by the passenger and the acceleration or deceleration control is performed automatically, and mode A-2 in which the acceleration or deceleration operation is performed by the passenger and the steering control is performed automatically, mode B: a manual driving mode in which the steering operation and the acceleration or deceleration operation are performed by the passenger, and mode C: an automatic driving mode in which operation control and acceleration or deceleration control are performed automatically. Further, the mode changeover switch 22 may receive an operation for switching the traveling state of the mobile object 1 to be described later (for example, a switching operation between the first traveling state and the second traveling state by the passenger). The above-described operation for switching the mode (or traveling state) may be received from a microphone or an internal camera provided in the mobile object 1 instead of the mode changeover switch 22. In this case, the control device 100 may receive a mode switching operation from an analysis result of vocal sound of the passenger input by the microphone, or may receive the mode switching operation from a gesture of the passenger, a motion of a mouth, or the like obtained as a result of analyzing a frontal image of the passenger captured by the internal camera.

The moving mechanism 30 is a mechanism for moving the mobile object 1 on the road. The moving mechanism 30 is, for example, a wheel group including a steering wheel and a driving wheel. Further, the moving mechanism 30 may be a leg portion for multi-legged walk.

The drive device 40 outputs a force to the moving mechanism 30 to move the mobile object 1. For example, the drive device 40 includes a motor that drives a drive wheel, a battery that stores power to be supplied to the motor, a steering device that adjusts a steering angle of the steering wheel, and the like. The drive device 40 may include an internal combustion engine, a fuel cell, or the like as a driving force output means or a power generation means. Further, the drive device 40 may further include a brake device based on a frictional force or air resistance.

The external notification device 50 is, for example, a lamp, a display device, or a speaker provided in an outer plate portion of the mobile object 1 to notify the outside of the mobile object 1 of information. The external notification device 50, for example, performs different operations depending on a difference in the traveling state of the mobile object 1 controlled by the controller 140. The traveling state includes, for example, at least a first traveling state and a second traveling state. The first traveling state is basically a traveling state in which the mobile object 1 moves on a roadway. The second traveling state is basically a traveling state in which the mobile object 1 moves on a sidewalk. In the embodiment, when a predetermined condition to be described later is satisfied, there may be an exceptional case where the vehicle travels on the roadway in the second traveling state. In the first traveling state, at least an upper limit speed of the mobile object 1 is limited to the first speed, and in the second traveling state, at least the upper limit speed of the mobile object 1 is limited to the second speed lower than the first speed.

For example, the external notification device 50 is controlled to cause the lamp to emit light when the mobile object 1 is moving on the sidewalk in the second traveling state, and cause the lamp not to emit light when the mobile object 1 is moving on the roadway in the first traveling state. A color of the light emitted from this lamp is preferably a color specified by law. Further, the external notification device 50 is controlled to cause the lamp to emit green light when the mobile object 1 is moving on the sidewalk and to cause the lamp to emit blue light when the mobile object 1 is moving on the roadway. When the external notification device 50 is the display device, the external notification device 50 displays text or graphics indicating that "the mobile object 1 is traveling on the sidewalk" when the mobile object 1 is traveling on the sidewalk. Further, when the predetermined condition is satisfied and the mobile object 1 is caused to travel on the roadway in the second traveling state, the external notification device 50 may cause the lamp to emit light in a color different from the above-described emission color, and may display text or graphics indicating the vehicle is traveling in the second traveling state on the display device.

Further, the external notification device 50 includes an audio output device such as a speaker in addition to (or in place of) an output from the lamp or the display device described above, and a sound indicating a state of the mobile object described above may be output from the speaker.

Figure 2:
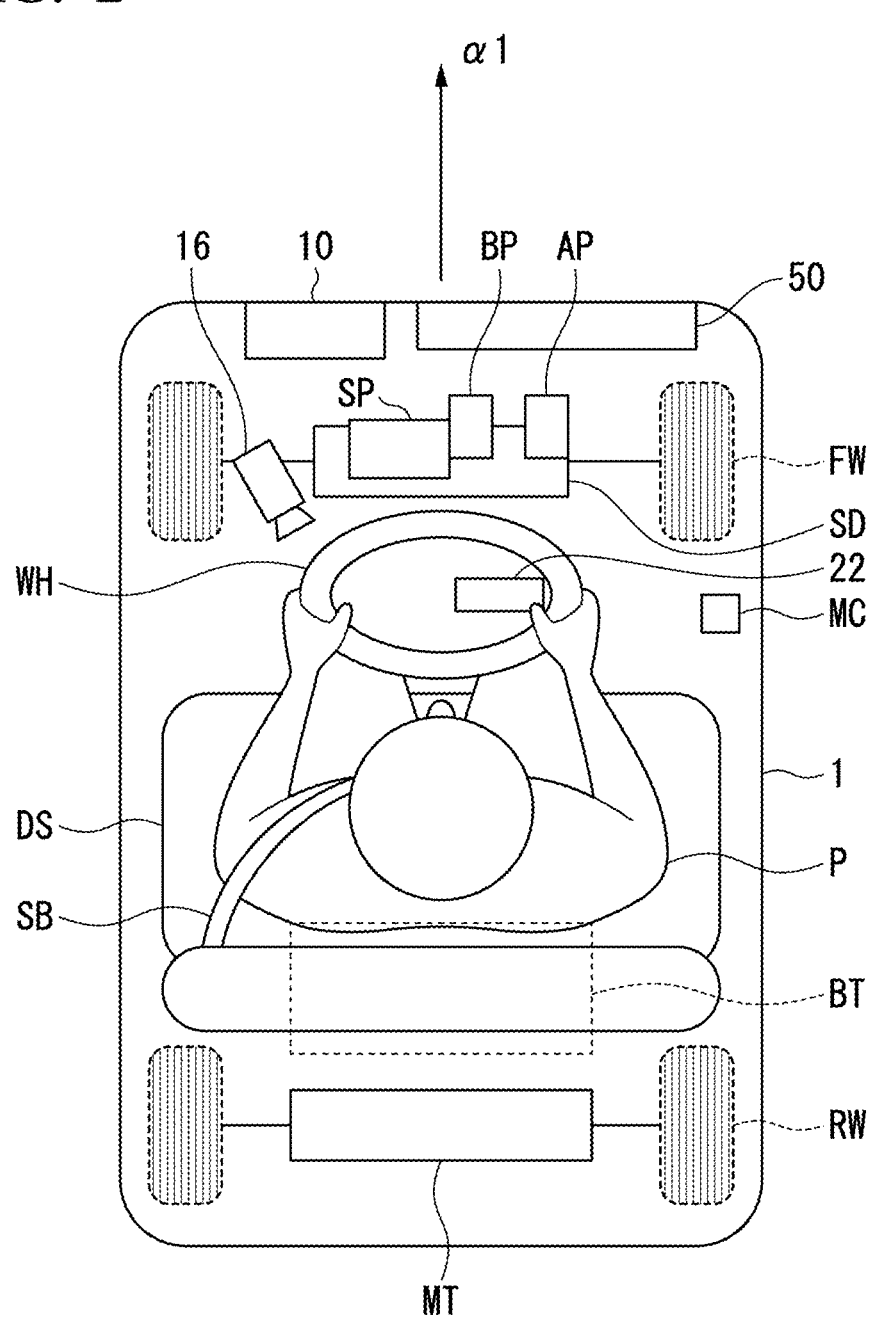
FIG. 2 is a perspective view of the mobile object 1 seen from above.

FIG. 2 is a perspective view of the mobile object 1 seen from above. In FIG. 2, FW denotes the steering wheel, RW denotes a driving wheel, SD denotes a steering device, MT denotes a motor, and BT denotes a battery. A steering device SD, a motor MT, and a battery BT are included in the drive device 40. Further, AP is an accelerator pedal, BP is a brake pedal, WH is a steering wheel, SP is a speaker, and MC is a microphone. The illustrated mobile object 1 is a one-person mobile object, and a passenger P is seated in a driver seat DS and is wearing a seat belt SB. Arrow al is the traveling direction (velocity vector) of the mobile object 1. The external detection device 10 is provided near a front end of the mobile object 1, the internal camera 16 is provided at a position where the internal camera can image the head of the passenger P from in front of the passenger P, and the mode changeover switch 22 is provided at a boss portion of the steering wheel WH. Further, an external notification device 50 as a display device is provided near the front end of the mobile object 1. The external notification device 50 may be formed integrally with a speaker SP.

Referring back to FIG. 1, the storage device 70 is a non-transitory storage device such as, for example, a hard disk drive (HDD), a flash memory, or a random access memory (RAM). The storage device 70 stores map information 72, a program 74 to be executed by the control device 100, and the like. Although the storage device 70 is shown outside a frame of the control device 100 in FIG. 1, the storage device 70 may be included in the control device 100.

Control Device

The control device 100 includes, for example, a road type recognizer 120, an object recognizer 130, and a controller 140. For example, the control device 100 is realized by a hardware processor such as a central processing unit (CPU) executing a program (software) 74. Some or all of these components may be realized by hardware (circuit portion: including circuitry) such as a large scale integration (LSI), application specific integrated circuit (ASIC), field-programmable gate array (FPGA), or graphics processing unit (GPU), or may be realized by collaboration between software and hardware. The program may be stored in the storage device 70 in advance or may be stored in a removable storage medium (non-transitory storage medium) such as a DVD or CD-ROM and the storage medium may be mounted on the drive device and installed in the storage device 70.

The road type recognizer 120 recognizes whether the mobile object 1 is moving on a roadway or is moving on a sidewalk. For example, the road type recognizer 120 recognizes whether the mobile object 1 is moving on the roadway or moving on the sidewalk, for example, by analyzing an image captured by the external camera of the external detection device 10. An output of a radar device, LIDAR, sensor fusion device, or the like may be used as an auxiliary.

An example of the image analysis may include semantic segmentation. The road type recognizer 120 classifies respective pixels in a frame of the image into classes (roadway, sidewalk, boundary, obstacle, and the like), assigns labels to the classes, recognizes that the mobile object 1 is moving on the roadway when many pixels to which a roadway label has been assigned are present in an area corresponding to the front of the mobile object 1, and recognizes that the mobile object 1 is moving on the sidewalk when many pixels to which a sidewalk label has been assigned are present in the area corresponding to the front of the mobile object 1 in the image. The present invention is not limited thereto, and the road type recognizer 120 may recognize that the mobile object 1 is moving on the roadway when a vehicle is recognized in the area corresponding to the front of the mobile object 1 in the image, and recognize that the mobile object 1 is moving on the sidewalk when a pedestrian is recognized in the area corresponding to the front of the mobile object 1 in the image. Further, the road type recognizer 120 may recognize that the mobile object 1 is moving on the roadway when a width of a road surface area in the area corresponding to the front of the mobile object 1 in the image is large, and may recognize that the mobile object 1 is moving on the sidewalk when the width of the road surface area in the area corresponding to the front of the mobile object 1 in the image is small.

Further, the road type recognizer 120 may collate the position information of the mobile object 1 from the position measurement device 18 with the map information 72, and recognize whether the mobile object 1 is moving on the roadway or on a sidewalk. The map information in this case needs to have enough accuracy to distinguish between the sidewalk and the roadway from position coordinates. Further, when the "predetermined area" is not only the sidewalk, the road type recognizer 120 performs the same processing on a roadside strip, a bicycle lane, a public open space, and the like.

The object recognizer 130 recognizes objects present around the mobile object 1 (within a predetermined distance from the mobile object 1) on the basis of an output of the external detection device 10. The objects include some or all of a mobile object such as a vehicle, a bicycle, or a pedestrian, a traveling road boundary such as a road marking, step, guardrail, road shoulder, or a median strip, a structure installed on a road such as a road sign or a signboard, and an obstacle such as a falling object present (falling) on a traveling road. Further, the object recognizer 130 may recognize a step or a groove present between the roadway and the sidewalk (at a boundary). The object recognizer 130, for example, inputs the image captured by the external camera of the external detection device 10 to a trained model trained to output information such as the presence, position, and type of an object to acquire information such as the presence, position, and type of another mobile object when the image captured by the external camera of the external detection device 10 is input. The type of other mobile object can also be estimated on the basis of a size in the image, intensity of a reflected wave received by a radar device of the external detection device 10, and the like. Further, the object recognizer 130 may recognize a speed of the other mobile object detected using Doppler shift or the like by a radar device, for example.

For example, the controller 140 controls the drive device 40 according to the driving mode set by the mode change-over switch 22 or the like. The mobile object 1 may execute only some of the following driving modes, but in either case, the controller 140 basically makes a speed limit value different between a case where the mobile object 1 moves on the roadway or the mobile object 1 moves on the sidewalk. In this case, the mode changeover switch 22 may be omitted.

In mode A-1, the controller 140 refers to information on the traveling road and the object based on an output of the object recognizer 130 to control the motor MT of the drive device 40 so that switching to the first traveling state is performed and a distance to the object present in front of the mobile object 1 is maintained at a certain distance or more when the mobile object 1 moves on the roadway, and the mobile object 1 moves at a first speed V1 (for example, a speed equal to or higher than 10 km/h and lower than tens of km/h) when the distance to the object in front of the mobile object 1 is sufficiently long. The controller 140 controls the motor MT of the drive device 40 so that switching to the second traveling state is performed and the distance to the object in front of the mobile object 1 is maintained at a certain distance or more when the mobile object 1 moves on the sidewalk, and the mobile object 1 moves at a second speed V2 (for example, a speed less than 10 km/h) when the distance to the object in front of the mobile object 1 is sufficiently long. This function is the same as an adaptive cruise control (ACC) function of the vehicle with the first speed V1 or the second speed V2 as a set speed, and a technology used in the ACC can be used. Further, in mode A-1, the controller 140 controls the steering device SD so that the steering device SD changes the steering angle of the steering wheel on the basis of an amount of operation of the operator 14 such as the steering wheel. This function is the same as that of a power steering device, and it is possible to use a technology that is used in the power steering device. The mobile object 1 may include a steering device in which the operator 14 and a steering mechanism are mechanically connected, without electronically controlling the steering.

In mode A-2, the controller 140 refers to the information on the traveling road and the object based on the output of the object recognizer 130 to generate a target trajectory on which the mobile object 1 can move while avoiding objects within the traveling road, and controls the steering device SD of the drive device 40 so that the mobile object 1 moves along the target trajectory. For acceleration or deceleration, the controller 140 controls the motor MT of the drive device 40 on the basis of a speed of the mobile object 1 and an amount of operation of the accelerator pedal or the brake pedal. The controller 140 performs switching to the first traveling state and controls the motor MT of the drive device 40 with the first speed V1 as the upper limit speed when the mobile object 1 is moving on the roadway (in the case of mode A-2, this means that the mobile object 1 is not be accelerated even when there is a further acceleration instruction in a case where the upper limit speed is reached), and performs switching to the second traveling state and controls the drive device 40 with the second speed V2 as the upper limit speed when the mobile object 1 is moving on the sidewalk.

In mode B, the controller 140 controls the motor MT of the drive device 40 on the basis of the speed of the mobile object 1 and the amount of operation of the accelerator pedal or the brake pedal. The controller 140 performs switching to the first traveling state and controls the motor MT of the drive device 40 with the first speed V1 as the upper limit speed when the mobile object 1 is moving on the roadway (in the case of mode B, this means that the mobile object 1 is not be accelerated even when there is the further acceleration instruction in a case where the upper limit speed is reached), and performs switching to the second traveling state and controls the motor MT of the drive device 40 with the second speed V2 as the upper limit speed when the mobile object 1 is moving on the sidewalk. Steering is the same as in mode A-1.

In mode C, the controller 140 refers to the information on the traveling road and the object based on the output of the object recognizer 130 to generate a target trajectory on which the mobile object 1 can move while avoiding objects within the traveling road, and controls the drive device 40 so that the mobile object 1 moves along the target trajectory. Also in mode C, the controller 140 performs switching to the first traveling state to control the drive device 40 with the first speed V1 as the upper limit speed when the mobile object 1 is moving on the roadway, and performs switching to the second traveling state to control the drive device 40 with the second speed V2 as the upper limit speed when the mobile object 1 is moving on the sidewalk.

Here, a sidewalk area may be cut off due to a T-junction, a crossroad, a construction, or another road situation, and in this case, the mobile object 1 traveling on the sidewalk may temporarily travel the roadway and travel on the sidewalk again, or continuously travel on the roadway. In each driving mode described above, since a traveling state (for example, the upper speed limit) is switched depending on switching between the sidewalk and the roadway, switching between the traveling states occurs frequently, which is likely to place a burden on the mobile object 1 or the passenger P, when the mobile object 1 temporarily travels from the sidewalk to the roadway and then immediately travels back to the sidewalk. Therefore, the controller 140 switches or continues the traveling state depending on the intention of the passenger P of the mobile object 1 as the predetermined condition under the above-described road situation. Hereinafter, some traveling state switching patterns in the controller 140 will be separately described.

First Switching Pattern

Figure 3:
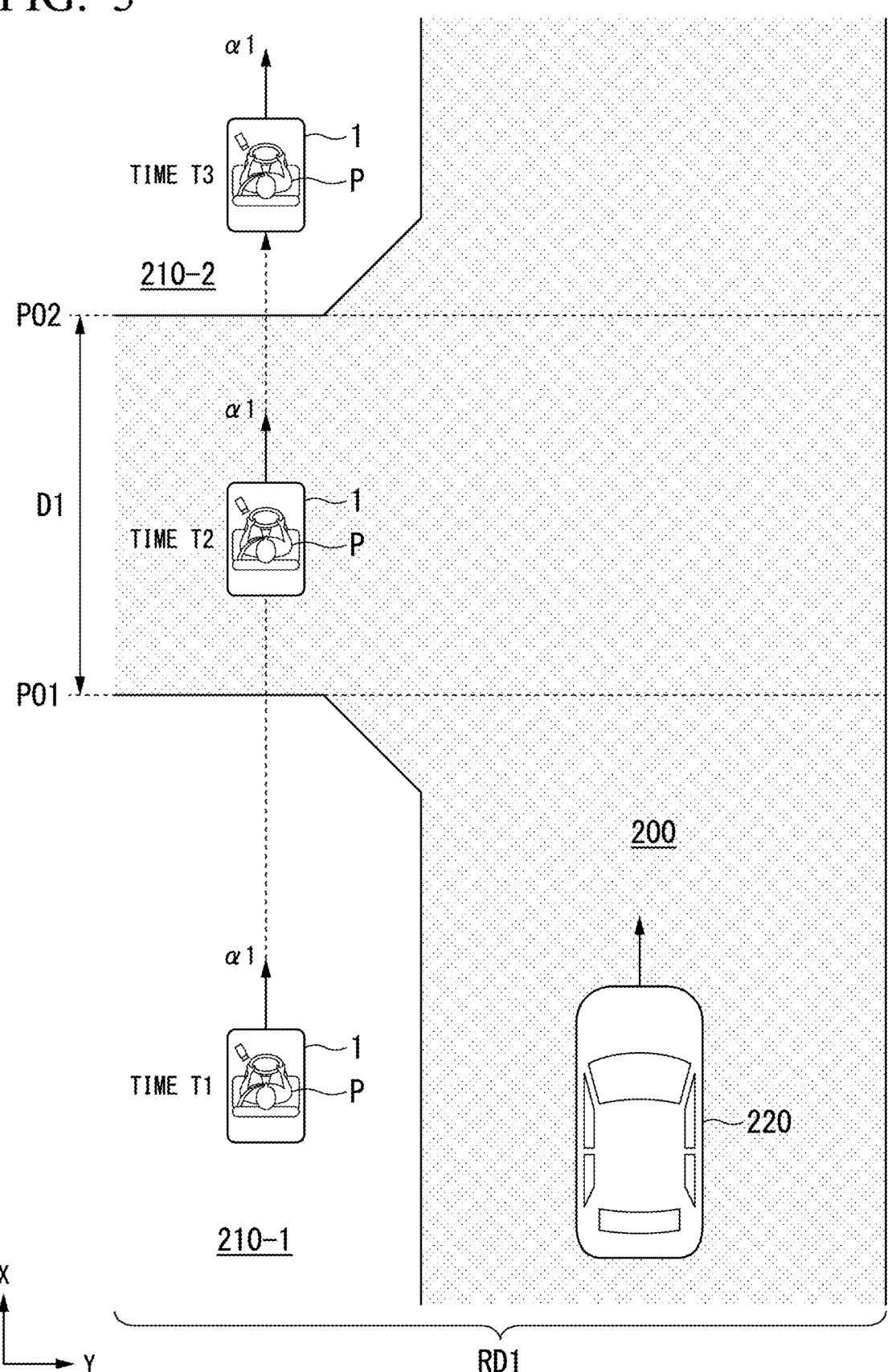
FIG. 3 is a diagram illustrating a first switching pattern of a traveling state of the mobile object 1.

FIG. 3 is a diagram illustrating a first switching pattern of the traveling state of the mobile object 1. In the example of FIG. 3, a road RD1 including a roadway area 200 and a sidewalk area 210 is shown. It is assumed that the road RD1 extends in an X-axis direction in FIG. 3, and that the mobile object 1 and a vehicle 220 are traveling in an extending direction. Further, in the example of FIG. 3, it is assumed that the sidewalk area 210 is divided into a sidewalk area 210-1 on the front side and a sidewalk area 210-2 on the rear side in the traveling direction of the mobile object 1 (in other words, a direction in which the road RD1 extends). Further, in FIG. 3, it is assumed that time T1 is the earliest, and time T2 (T2 # to be described later) and T3 are delayed in this order. Further, FIG. 3 shows a position or traveling direction of the mobile object 1 at each time. It is assumed that the same applies to subsequent figures.

At time T1, the mobile object 1 is traveling in the extending direction on the sidewalk area 210-1 of the road RD1. In this case, the road type recognizer 120 recognizes that a type of road on which the mobile object 1 is currently traveling is the sidewalk. The controller 140 performs control so that the mobile object 1 is caused to travel in the second traveling state in which the mobile object 1 travels on the sidewalk. Further, the controller 140 causes the external notification device 50 to notify of, for example, information (text, graphics, sound, or lamp color) indicating that the mobile object is traveling on the sidewalk in the second traveling state.

At time T2, since the sidewalk area 210-1 and the sidewalk area 210-2 are cut off, the mobile object 1 travels in the roadway area 200 toward the sidewalk area 210-2 from the sidewalk area 210-1. In this case, the road type recognizer 120 recognizes that the type of road on which the mobile object 1 is currently traveling is the roadway. Furthermore, the object recognizer 130 recognizes that the sidewalk area 210-2 is present in the traveling direction (front) of the mobile object 1. The controller 140 performs switching between the first traveling state and the second traveling state in response to an instruction regarding the traveling state of the mobile object 1 received from the passenger P when the mobile object 1 that has been traveling on the sidewalk area 210-1 travels on the roadway area 200, on the basis of recognition results of the road type recognizer 120 and the object recognizer 130. Here, the instruction regarding the traveling state of the mobile object 1 received from the passenger P is, for example, an instruction based on the intention of the passenger P indicating whether the passenger P wants to travel on the sidewalk or wants to travel on the roadway. Further, the instruction regarding the traveling state of the mobile object 1 received from the passenger P may be, for example, an instruction for transferring, to the mobile object 1, an intention as to whether the passenger P wants to cause the mobile object 1 to travel in the first traveling state or to travel in the second traveling state (an instruction for transferring a traveling state desired by the passenger P to the mobile object 1). That is, when the mobile object 1 that has been traveling on the sidewalk area 210-1 travels on the roadway area 200, the controller 140 switches the traveling state after confirming the intention of the passenger P.

For example, the controller 140 confirms the intention of the passenger on the basis of the steering content of the passenger received by the steering wheel included in the operator 14, for example. For example, when the amount of steering of the steering wheel during a predetermined period of time (for example, from time T1 to time T2) (or the amount of steering after the mobile object 1 leaves the sidewalk area 210-1) is smaller than the predetermined amount, the controller 140 confirms (estimates) the intention of the passenger P to travel on the sidewalk (intention to continue the second traveling state), and continues the second traveling state even at time T2 the mobile object 1 travels on the roadway. Accordingly, since the mobile object 1 travels on the sidewalk (the sidewalk area 210-2) again, and the second traveling state continues after time T3, it is possible to reduce the burden on the mobile object 1 or the passenger P due to switching between the traveling states and to cause the mobile object 1 to travel in a more appropriate traveling state.

When a distance D1 from a termination end PO1 of the sidewalk area 210-1 on which the mobile object 1 was traveling to a starting end PO2 of the sidewalk area 210-2 toward which the mobile object 1 is heading (which is present in the traveling direction of the mobile object 1) is long, the mobile object 1 must continue to travel in the roadway area 200 at low speed, which may obstruct, for example, other vehicles (for example, the vehicle 220) traveling in the roadway area 200 when the other vehicles wish to turn left. Therefore, the controller 140 may perform control for continuing the second traveling state in a case where the distance D1 from the sidewalk area 210-1 where the mobile object 1 was traveling to the next sidewalk area 210-2 (an example of another predetermined area) is smaller than a predetermined distance Dth, in addition to the case where the amount of steering is smaller than the predetermined amount. This makes it possible for the mobile object 1 to travel more appropriately without interfering with the traveling of nearby vehicles or the like.

Further, the controller 140 causes the external notification device 50 to notify of, for example, information (text, graphics, sound, or lamp color) indicating that the mobile object is exceptionally traveling on the roadway in the second traveling state. In this case, the controller 140 causes, for example, light to be emitted in a display aspect (for example, different colors or blinking) different from the color of the light emitted by the lamp when the mobile object is traveling on the roadway in the first traveling state and the color of the light emitted by the lamp when the mobile object is traveling on the sidewalk in the second traveling state. Further, the controller 140 may display text or graphics indicating that "the mobile object is traveling at a low speed because the mobile object is heading toward the sidewalk" or "the mobile object is traveling at a low speed because the mobile object is temporarily traveling on the roadway" on the display device of the external notification device 50.

When the mobile object 1 temporarily travels in the roadway area 200 in the second traveling state according to the intention of the passenger P along a traveling route as shown in FIG. 3, the second traveling state continues without the switching from the second traveling state to the first traveling state even when an operation to accelerate the mobile object 1 is received by an accelerator pedal, a speed adjustment dial, a lever, or the like included in the operator 14 during traveling in the roadway area 200.

Therefore, speed control with the second speed V2 as the upper limit speed is executed. Further, when the amount of steering of the steering wheel for a predetermined period of time (or an amount of steering after the mobile object 1 leaves the sidewalk area 210-1) is equal to or larger than the predetermined amount, the controller 140 confirms (estimates) an intention of the passenger P to travel on the roadway (intention to switch to the first traveling state), and performs switching from the second traveling state to the first traveling state.

Figure 4:
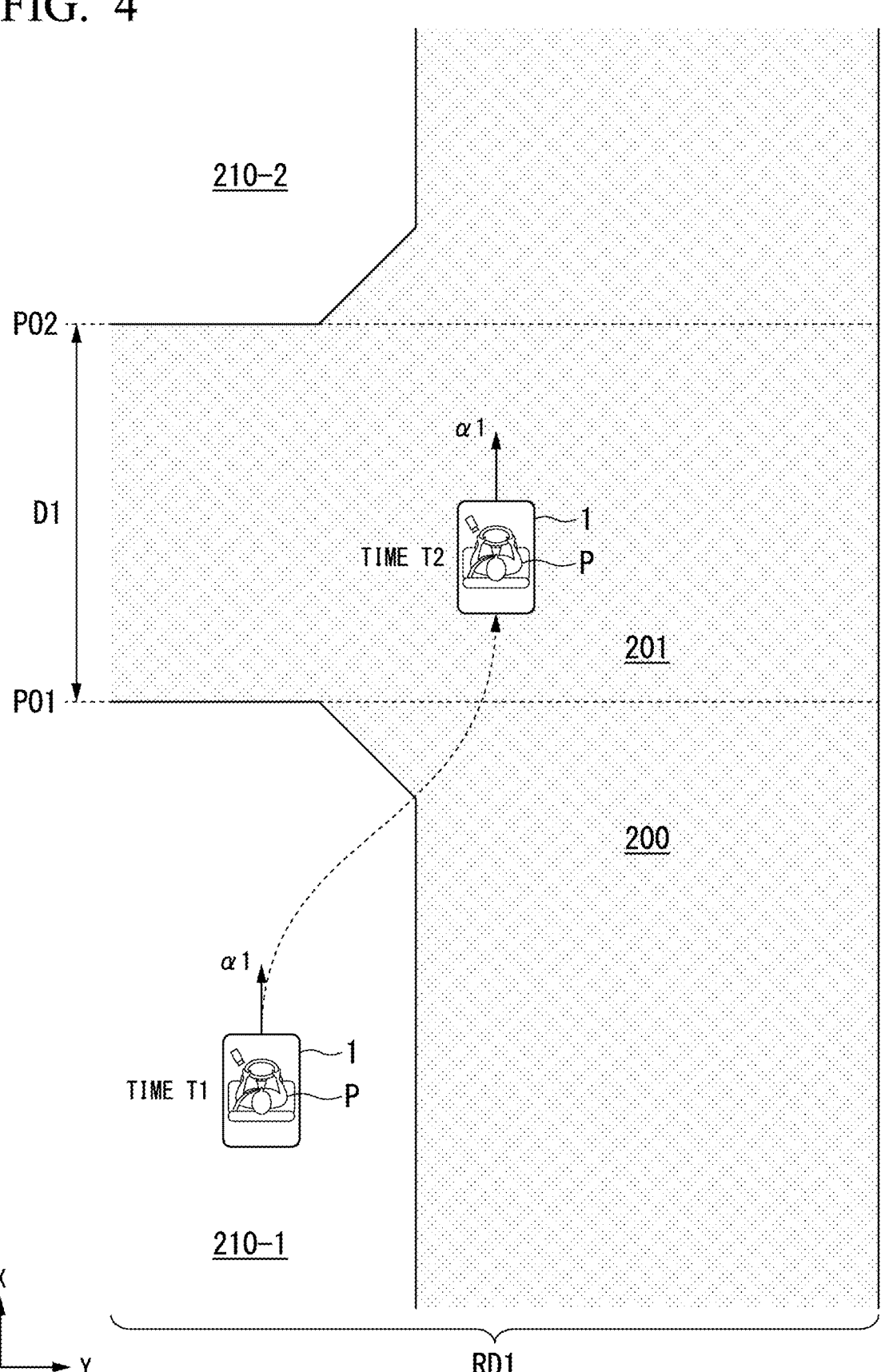
FIG. 4 is a diagram showing an example in which switching from the second traveling state to the first traveling state is performed.

FIG. 4 is a diagram showing an example of switching from the second traveling state to the first traveling state.

The example in FIG. 4 differs from the example in FIG. 3 in that the steering amount is equal to or larger than a predetermined amount due to the steering operation by the passenger P between time T1 and time T2. Thus, when the mobile object 1 moves toward the roadway area 200 (in other words, in a direction away from the sidewalk area 210-2) due to the steering control of the passenger P, the controller 140 switches the traveling state of the mobile object 1 from the second traveling state to the first traveling state. Further, the controller 140 causes the external notification device 50 to notify, for example, information (text, graphics, sound, or lamp color) indicating that the mobile object is traveling on the roadway in the first traveling state. Accordingly, since the mobile object 1 can accelerate to a second speed, which is higher than the second speed which is the upper limit speed when the mobile object 1 travels on the sidewalk, it is possible to curb interference with traveling of nearby vehicles and perform more appropriate traveling.

Second Switching Pattern

Figure 5:
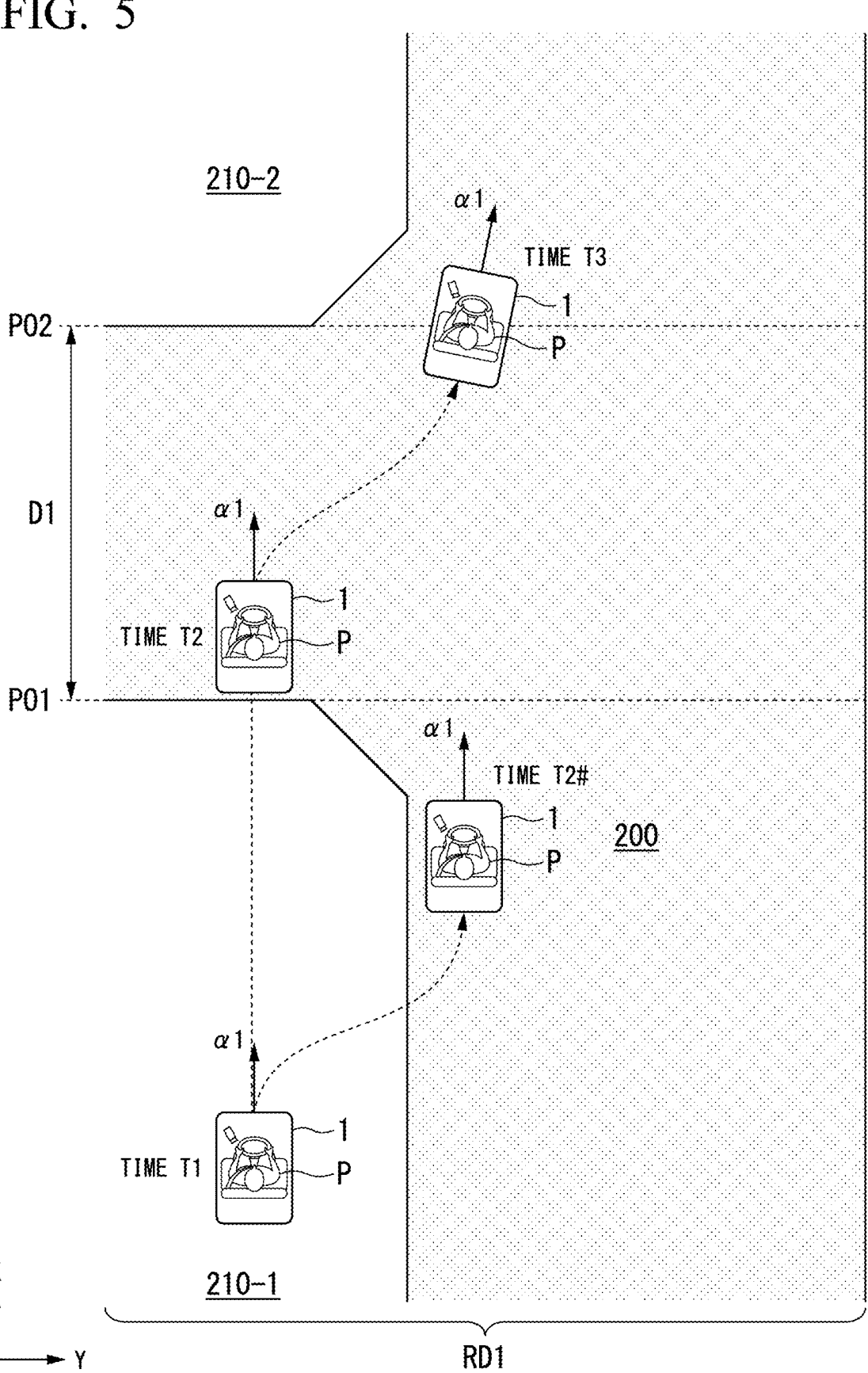
FIG. 5 is a diagram illustrating a second switching pattern of the traveling state of the mobile object 1.

FIG. 5 is a diagram illustrating the second switching pattern of the traveling state of the mobile object 1. In the example of FIG. 5, the same road RD1 as in FIGS. 3 and 4 is shown. At time T1, the mobile object 1 is traveling in an extension direction on the sidewalk area 210-1 of the road RD1. The road type recognizer 120 recognizes that the type of road on which the mobile object 1 is currently traveling is the sidewalk. The controller 140 causes the mobile object 1 to travel in the second traveling state in which the mobile object 1 travels on the sidewalk, and causes the external notification device 50 to notify of, for example, the information (text, graphics, sound, or lamp color) indicating that the mobile object is traveling on the sidewalk in the second traveling state.

At time T2, the road type recognizer 120 recognizes that the type of road on which the mobile object 1 is currently traveling is the roadway. Here, in the second switching pattern, the controller 140 confirms the intention of the passenger P on the basis of the position of the mobile object. For example, when the sidewalk area is present in a road width direction (Y-axis direction in the figure) with respect to a current position of the mobile object 1, the object recognizer 130 confirms (estimates) the intention of the passenger to travel on the roadway, and performs switching from the second traveling state to the first traveling state. At time T3 shown in FIG. 5, the sidewalk area 210-2 is present in the road width direction at a reference position (for example, a center of gravity) of the mobile object 1. Therefore, in the second switching pattern, the controller 140 switches the traveling state of the mobile object 1 from the second traveling state to the first traveling state at time T3.

Further, the mobile object 1 switches the traveling state of the mobile object 1 from the second traveling state to the first traveling state since the sidewalk area 210-1 is present in a position of the mobile object 1 in the road width direction even when the mobile object goes to the roadway area 200 (when the mobile object moves to a position shown at time T2 #shown in FIG. 5) before the mobile object 1 reaches the termination end PO1 of the sidewalk area 210-1 from a state in which the mobile object 1 is traveling on the sidewalk area 210-1. In the second switching pattern, it is possible to confirm the intention of the passenger and perform travel control of the mobile object 1 more appropriately according to the intention of the user, by setting the condition that the mobile object 1 is not moving toward the sidewalk even though there is the sidewalk in the road width direction from the reference position of the mobile object 1.

When there is a step or groove between the roadway and the sidewalk depending on the road situation, even when the passenger P wants to move the mobile object 1 from the roadway area to the sidewalk area, the passenger P may not be able to move immediately. Therefore, when the object recognizer 130 determines that a sidewalk is present in the road width direction from the reference position of the mobile object 1 and the sidewalk is an area where the mobile object 1 can move from the roadway, the controller 140 may perform control for switching the traveling state of the mobile object 1 traveling on the roadway from the second traveling state to the first traveling state.

Processing Flow

Figure 6:
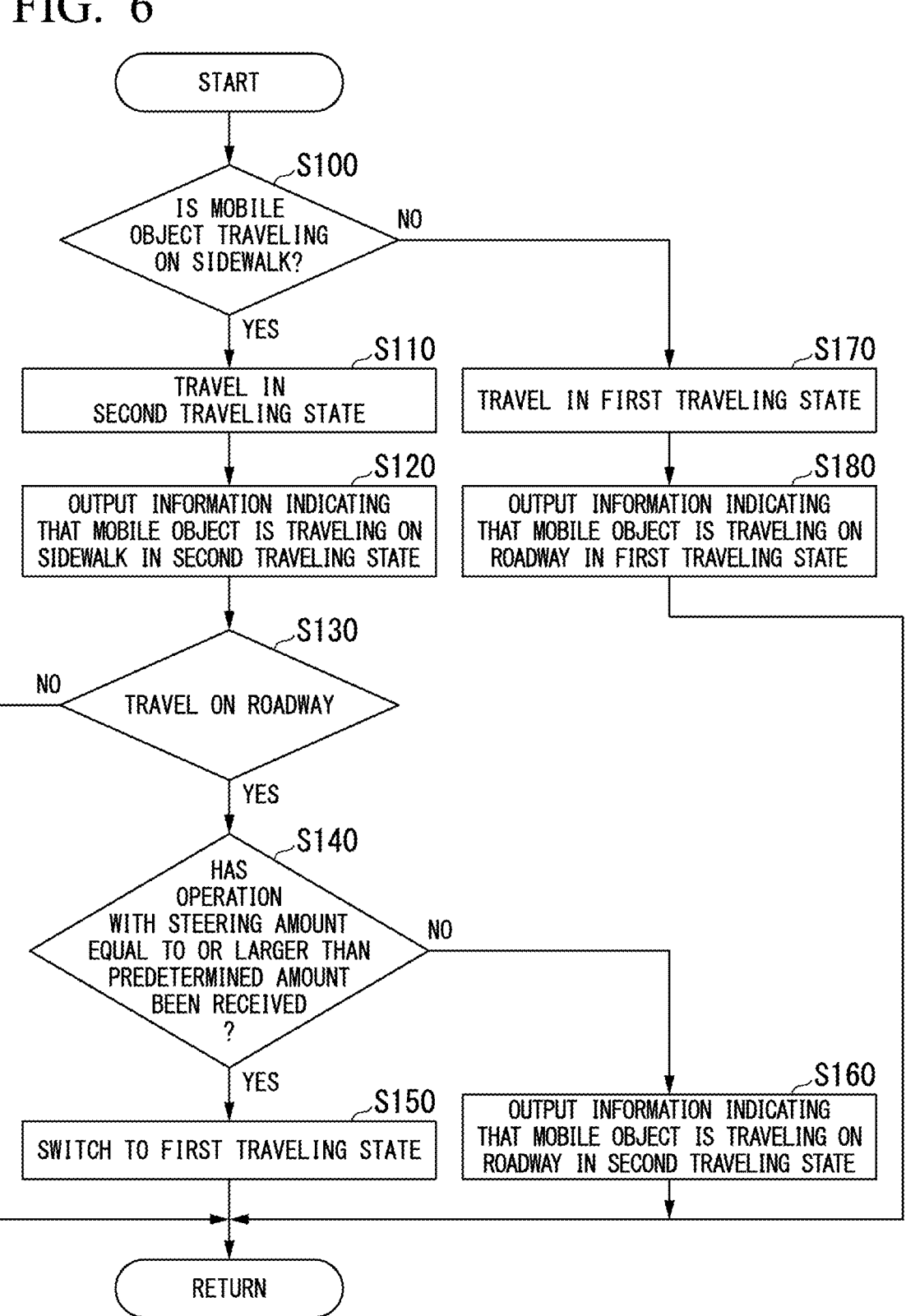
FIG. 6 is a flowchart showing an example of a flow of processing that is executed by control device 100 of the embodiment.

FIG. 6 is a flowchart showing an example of a flow of processing executed by the control device 100 of the embodiment. In the example of FIG. 6, traveling state switching processing among various types of processing that are executed by the control device 100 will be mainly described. The processing in FIG. 6 may be repeatedly executed at a predetermined timing. In the example of FIG. 6, the road type recognizer 120 determines whether the mobile object 1 is traveling on the sidewalk (step S100). When a determination is made that the mobile object is traveling on a sidewalk, the controller 140 causes the mobile object to travel in the second traveling mode (step S110). Further, the controller 140 causes the external notification device 50 to output the information indicating that the mobile object is traveling on the sidewalk in the second traveling state (step S120).

Next, the road type recognizer 120 determines whether the mobile object 1 is traveling on the roadway (step S130). When a determination is made that the mobile object is traveling on the roadway, the controller 140 determines whether or not an operation with a steering amount equal to or larger than a predetermined amount has been received by the operator 14 (step S140). When a determination is made that an operation with the steering amount equal to or larger than the predetermined amount has been received, the controller 140 switches the traveling state of the mobile object 1 from the second traveling state to the first traveling state (step S150). Further, in the processing of step S140, when a determination is made that the operation with the steering amount equal to or larger than the predetermined amount has not been received (the steering amount is smaller than the predetermined amount), the controller 140 continues the second traveling state until the mobile object travels on the sidewalk next time and causes the external notification device 50 to output information indicating that the mobile object is traveling on the roadway in the second traveling state (step S160)

Further, in the processing of step S100, when a determination is made that the mobile object 1 is not traveling on the sidewalk, the controller 140 causes the mobile object 1 to travel in the first traveling state (step S170), and causes the external notification device 50 to output the information indicating that the mobile object 1 is traveling on the roadway in the first traveling state (step S180). Accordingly, the processing of this flowchart ends. Further, in the processing of step S130, when a determination is made that the mobile object 1 is not traveling on the roadway, the processing of the flowchart ends.

Modification Examples

In the embodiment described above, the intention of the passenger P may be confirmed on the basis of the traveling state received by the mode changeover switch 22 instead of (or in addition to) confirming the intention of the passenger P according to the amount of steering obtained from the operator 14. For example, the controller 140 maintains the second traveling state when an instruction to perform the second traveling state is received by the mode changeover switch 22, and performs switching from the second traveling state to the first traveling state when an instruction to perform the first traveling state is received, in a case where the mobile object 1 that has been traveling on the sidewalk is traveling on the roadway and another sidewalk is present in front of the mobile object 1 (in the traveling direction). This makes it possible to ascertain the intention of the passenger P more accurately, and to realize appropriate travel control depending on the intention. Further, in the embodiment, the traveling state switching control may be performed on the basis of a traveling state switching operation analyzed on the basis of information obtained from the microphone MC or the internal camera 16 instead of (or in addition to) the mode changeover switch 22.

Further, in the embodiment, when the controller 140 performs exceptional travel control (for example, when the mobile object 1 is traveling on the roadway in the second traveling state), the controller 140 may notify the passenger of information for performing switching to the first traveling state. In this case, the controller 140 causes, for example, at least one of information on a reason why the second traveling state is being executed even though the mobile object is traveling on the roadway and information indicating an operation to be performed for switching to the first traveling state to be notified from the speaker SP or the external notification device 50 to the passenger. This makes it possible to cause the passenger to more accurately ascertain a situation of the mobile object 1, and also transfer the intention of the passenger to the mobile object 1 more accurately through a predetermined operation.

According to the embodiment described above, a device 100 for controlling a mobile object 1 capable of moving both on a roadway and in a predetermined area different from the roadway, one or more passengers boarding the mobile object, includes a road type recognizer 120 configured to recognize whether the mobile object 1 is moving on the roadway or moving in the predetermined area on the basis of an output of an external detection device 10 configured to detect an external situation of the mobile object 1: and a controller 140 configured to cause the mobile object to travel in any one of a first traveling state in which a speed of the mobile object 1 is limited to a first speed and a second traveling state in which the speed of the mobile object 1 is limited to a second speed lower than the first speed, on the basis of a road type recognized by the road type recognizer, wherein the controller 140 causes the mobile object 1 to travel in the second traveling state when the mobile object 1 is traveling in the predetermined area, and performs switching between the first traveling state and the second traveling state in response to an instruction regarding the traveling state of the mobile object received from the passenger when the mobile object 1 is caused to travel from the predetermined area to the roadway, thereby causing the mobile object to travel in a more appropriate traveling state depending on a surrounding road situation.

The embodiment described above can be expressed as follows.

A device for controlling a mobile object includes a storage medium that stores instructions readable by a computer for controlling a mobile object capable of moving both on a roadway and in a predetermined area different from the roadway, one or more passengers boarding the mobile object, and a processor connected to the storage medium, the processor executing the computer-readable instructions to: recognize whether the mobile object is moving on the roadway or moving in the predetermined area on the basis of an output of an external detection device configured to detect an external situation of the mobile object, cause the mobile object to travel in any one of a first traveling state in which a speed of the mobile object is limited to a first speed and a second traveling state in which the speed of the mobile object is limited to a second speed lower than the first speed, on the basis of a recognized road type, and cause the mobile object to travel in the second traveling state when the mobile object is traveling in the predetermined area, and perform switching between the first traveling state and the second traveling state in response to an instruction regarding the traveling state of the mobile object received from the passenger when the mobile object is caused to travel from the predetermined area to the roadway.

Although the mode for implementing the present invention has been described above using the embodiments, the present invention is not limited to these embodiments in any way, and various modifications and substitutions can be made without departing from the gist of the present invention.

REFERENCE SIGNS LIST

10 External detection device
12 Mobile object sensor
14 Operator
16 Internal camera
18 Position measurement device
22 Mode changeover switch
30 Moving mechanism
40 Drive device
50 External notification device
70 Storage device
100 Control device
120 Road type recognizer
130 Object recognizer
140 Controller

The invention claimed is:

1. A device for controlling a mobile object capable of moving both on a roadway and in a predetermined area different from the roadway, one or more passengers, comprising a passenger, boarding the mobile object, the device for controlling a mobile object comprising:
at least one memory storing instructions; and
at least one processor configured to execute the instructions stored in the memory to:
recognize whether the mobile object is moving on the roadway or moving in the predetermined area on the basis of an output of an external detection device configured to detect an external situation of the mobile object;
cause the mobile object to travel in any one of a first traveling state in which a speed of the mobile object is limited to a first speed and a second traveling state in which the speed of the mobile object is limited to a second speed lower than the first speed, on the basis of a road type recognized, wherein
the at least one processor causes the mobile object to travel in the second traveling state when the mobile object is traveling in the predetermined area, and performs switching between the first traveling state and the second traveling state in response to a travel state-related instruction received from the passenger when the mobile object is caused to travel from the predetermined area to the roadway; and
receive a driving operation for the mobile object by the passenger,
wherein the at least one processor determines whether to perform switching from the second traveling state to the first traveling state on the basis of a steering operation of the mobile object,
wherein the at least one processor does not perform switching from the second traveling state to the first traveling state even when the mobile object travels on the roadway from the predetermined area when an amount of steering is smaller than a predetermined amount, and
wherein, when the mobile object moves from the predetermined area to the roadway and the amount of steering is smaller than the predetermined amount, the at least one processor does not perform the switching from the second traveling state to the first traveling state even when an operation to accelerate the mobile object is received.

2. The device for controlling a mobile object according to claim 1, wherein the at least one processor performs switching from the second traveling state to the first traveling state when control for moving the mobile object toward the roadway through a steering operation is performed.

3. The device for controlling a mobile object according to claim 1, wherein the at least one processor performs switching from the second traveling state to the first traveling state when the predetermined area is present in a road width direction with a position of the mobile object leaving the predetermined area and traveling on the roadway as a reference.

4. The device for controlling a mobile object according to claim 1, wherein the at least one processor further executes instructions to:
receive an instruction regarding switching a traveling state of the mobile object, wherein the at least one processor determines whether to perform switching from the second traveling state to the first traveling state on the basis of the instruction received.

5. The device for controlling a mobile object according to claim 1, wherein the at least one processor notifies an external notification device of the mobile object that the mobile object is traveling on the roadway in the second traveling state when the mobile object is traveling on the roadway in the second traveling state.

6. The device for controlling a mobile object according to claim 1, wherein the at least one processor notifies the passenger of information for switching from the second traveling state to the first traveling state when the mobile object is traveling on the roadway in the second traveling state.

7. A method for controlling a mobile object comprising:
recognizing whether the mobile object is moving on a roadway or moving in a predetermined area on the basis of an output of an external detection device configured to detect an external situation of the mobile object, by a computer for controlling the mobile object capable of moving both on the roadway and in the predetermined area different from the roadway, one or more passengers, comprising a passenger, boarding the mobile object;
causing, by the computer, the mobile object to travel in any one of a first traveling state in which a speed of the mobile object is limited to a first speed and a second traveling state in which the speed of the mobile object is limited to a second speed lower than the first speed, on the basis of a recognized road type;

causing, by the computer, the mobile object to travel in the second traveling state when the mobile object is traveling in the predetermined area, and performing switching between the first traveling state and the second traveling state in response to a travel state-related instruction received from the passenger when the mobile object is caused to travel from the predetermined area to the roadway;

receiving, by the computer, a driving operation for the mobile object by the passenger;

determining, by the computer, whether to perform switching from the second traveling state to the first traveling state on the basis of a steering operation of the mobile object;

determining, by the computer, that switching from the second traveling state to the first traveling state is not to be performed even when the mobile object travels on the roadway from the predetermined area when an amount of steering is smaller than a predetermined amount; and when the mobile object moves from the predetermined area to the roadway and the amount of steering is smaller than the predetermined amount, determining, by the computer, that the switching from the second traveling state to the first traveling state is not to be performed even when an operation to accelerate the mobile object is received.

8. A device for controlling a mobile object capable of moving both on a roadway and in a predetermined area different from the roadway, one or more passengers, comprising a passenger, boarding the mobile object, the device for controlling a mobile object comprising:

at least one memory storing instructions; and at least one processor configured to execute the instructions stored in the memory to:

recognize whether the mobile object is moving on the roadway or moving in the predetermined area on the basis of an output of an external detection device configured to detect an external situation of the mobile object;

cause the mobile object to travel in any one of a first traveling state in which a speed of the mobile object is limited to a first speed and a second traveling state in which the speed of the mobile object is limited to a second speed lower than the first speed, on the basis of a road type recognized, wherein the at least one processor causes the mobile object to travel in the second traveling state when the mobile object is traveling in the predetermined area, and performs switching between the first traveling state and the second traveling state in response to a travel state-related instruction received from the passenger when the mobile object is caused to travel from the predetermined area to the roadway; and receive a driving operation for the mobile object by the passenger, wherein the at least one processor determines whether to perform switching from the second traveling state to the first traveling state on the basis of a steering operation of the mobile object, wherein the at least one processor continues the second traveling state when the amount of steering is smaller than the predetermined amount and a distance from the predetermined area in which the mobile object is traveling to another predetermined area is smaller than a predetermined distance.

9. A method for controlling a mobile object comprising:

recognizing whether the mobile object is moving on a roadway or moving in a predetermined area on the basis of an output of an external detection device configured to detect an external situation of the mobile object, by a computer for controlling the mobile object capable of moving both on the roadway and in the predetermined area different from the roadway, one or more passengers, comprising a passenger, boarding the mobile object;

causing, by the computer, the mobile object to travel in any one of a first traveling state in which a speed of the mobile object is limited to a first speed and a second traveling state in which the speed of the mobile object is limited to a second speed lower than the first speed, on the basis of a recognized road type;

causing, by the computer, the mobile object to travel in the second traveling state when the mobile object is traveling in the predetermined area, and performing switching between the first traveling state and the second traveling state in response to a travel state-related instruction received from the passenger when the mobile object is caused to travel from the predetermined area to the roadway;

receiving, by the computer, a driving operation for the mobile object by the passenger, determining, by the computer, whether to perform switching from the second traveling state to the first traveling state on the basis of a steering operation of the mobile object; and continuing, by the computer, the second traveling state when the amount of steering is smaller than the predetermined amount and a distance from the predetermined area in which the mobile object is traveling to another predetermined area is smaller than a predetermined distance.

* * * * *